US 10,683,032 B2

(12) United States Patent
Toyama (10) Patent No.: US 10,683,032 B2
(45) Date of Patent: Jun. 16, 2020

(54) TORQUE DETECTION DEVICE AND ELECTRIC POWER STEERING SYSTEM

(71) Applicant: JTEKT CORPORATION, Osaka-shi, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 309 days.

(21) Appl. No.: 15/653,839

(22) Filed: Jul. 19, 2017

(65) Prior Publication Data
US 2018/0029638 A1    Feb. 1, 2018

(30) Foreign Application Priority Data

Jul. 27, 2016    (JP) .................................. 2016-147771

(51) Int. Cl.
| | |
|---|---|
| *B62D 6/10* | (2006.01) |
| *B62D 3/12* | (2006.01) |
| *B62D 5/04* | (2006.01) |
| *G01L 3/10* | (2006.01) |
| *G01L 5/22* | (2006.01) |

(52) U.S. Cl.
CPC ............... *B62D 6/10* (2013.01); *B62D 3/123* (2013.01); *B62D 5/0463* (2013.01); *G01L 3/104* (2013.01); *G01L 5/221* (2013.01)

(58) Field of Classification Search
None
See application file for complete search history.

(56) References Cited

U.S. PATENT DOCUMENTS

2015/0033877 A1    2/2015 Hotta et al.

FOREIGN PATENT DOCUMENTS

| EP | 0891923 A2 | 1/1999 |
|---|---|---|
| EP | 2 833 110 A1 | 2/2015 |
| JP | 3954693 B2 | 8/2007 |
| JP | 2015-031600 A | 2/2015 |
| WO | 2011/048846 A1 | 4/2011 |

OTHER PUBLICATIONS

Jan. 3, 2018 Search Report issued in European Patent Application No. 17182856.9.
Feb. 25, 2020 Office Action issued in Japanese Patent Application No. 2016-147771.

*Primary Examiner* — Christian Chace
*Assistant Examiner* — Kyung J Kim
(74) *Attorney, Agent, or Firm* — Oliff PLC (57) ABSTRACT

A torque detection device that further suppresses intrusion of foreign matter into a magnetism collection holder. A first magnetism collection holder has a first ring portion and a substrate housing portion. A second magnetism collection holder has a second ring portion and a substrate housing portion. A pair of flanges are provided on both side surfaces of the substrate housing portion. The substrate housing portion is provided with a partition wall to be fitted between the flanges. A substrate arrangement portion is provided with a partitioning portion and an extended portion. When the substrate housing portion and the substrate housing portion are stacked on each other, the extended portion is fitted with a recessed portion. The substrate arrangement portion is also provided with a partitioning portion. An extended portion to be fitted with the recessed portion is provided at the distal end of the partitioning portion.

10 Claims, 6 Drawing Sheets

TORQUE DETECTION DEVICE AND ELECTRIC POWER STEERING SYSTEM

INCORPORATION BY REFERENCE

The disclosure of Japanese Patent Application No. 2016-147771 filed on Jul. 27, 2016 including the specification, drawings and abstract, is incorporated herein by reference in its entirety.

BACKGROUND OF THE INVENTION

1. Field of the Invention

The present invention relates to a torque detection device and an electric power steering system that includes the torque detection device.

2. Description of the Related Art

There has hitherto been known a torque detection device that detects torque applied to a rotary shaft as described in Japanese Patent Application Publication No. 2015-31600 (JP 2015-31600 A). The rotary shaft is constituted of an input shaft on the input side, an output shaft on the output side, and a torsion bar that couples the input shaft and the output shaft to each other.

The torque detection device has a permanent magnet fixed to the input shaft, a plurality of magnetic yokes that are fixed to the output shaft and that form a magnetic circuit that matches the magnetic field of the permanent magnet, a pair of magnetism collection rings that guide magnetic flux from the magnetic yokes, a magnetism collection holder that holds the magnetism collection rings and that is made of an insulator, and a magnetic sensor that detects magnetic flux guided to the magnetism collection rings.

The magnetism collection holder of the torque detection device according to JP 2015-31600 A is constituted by assembling a pair of separated holders to each other. The magnetic sensor is disposed between the two separated magnetism collection holders.

Such a magnetism collection holder has a mating surface between the two separated magnetism collection holders, and therefore foreign matter such as water may intrude into the magnetism collection holder from the mating surface. The foreign matter may adhere to an integrated circuit (IC) of the magnetic sensor.

SUMMARY OF THE INVENTION

It is an object of the present invention to provide a torque detection device capable of suppressing intrusion of foreign matter into a magnetism collection holder and an electric power steering system that includes the torque detection device.

An aspect of the present invention provides a torque detection device including:

a permanent magnet;

a magnetic yoke which is disposed in a magnetic field formed by the permanent magnet and a position of which relative to the permanent magnet is variable;

a tubular magnetism collection unit that has a tubular magnetism collection holder and a magnetism collection ring, the magnetism collection holder being formed so as to surround the magnetic yoke and composed of a first magnetism collection holder and a second magnetism collection holder, which are adjacent to each other in an axial direction, assembled to each other, and the magnetism collection ring being attached to an inner peripheral surface of the magnetism collection holder to collect magnetic flux of the magnetic yoke; and a magnetic sensor that detects magnetic flux generated in a magnetic circuit formed by the permanent magnet, the magnetic yoke, and the magnetism collection ring, in which:

the first magnetism collection holder and the second magnetism collection holder have respective substrate housing portions that project in a radial direction to house the magnetic sensor; and a concavo-convex shape on a side of the substrate housing portion of the first magnetism collection holder and a concavo-convex shape on a side of the substrate housing portion of the second magnetism collection holder are formed on respective mating surfaces of the substrate housing portion of the first magnetism collection holder and the substrate housing portion of the second magnetism collection holder to be fitted with each other.

With this configuration, when the first magnetism collection holder and the second magnetism collection holder are mated with each other, the concavo-convex shape of the substrate housing portion of the first magnetism collection holder and the concavo-convex shape of the substrate housing portion of the second magnetism collection holder are fitted with each other to form mating surfaces that define a path for intrusion of foreign matter such as water. Therefore, when foreign matter such as water intrudes along the mating surfaces, the concavo-convex shape of the substrate housing portion of the first magnetism collection holder and the concavo-convex shape of the substrate housing portion of the second magnetism collection holder make movement of such foreign matter difficult. Therefore, it is possible to suppress intrusion of foreign matter such as water into the magnetism collection holder.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
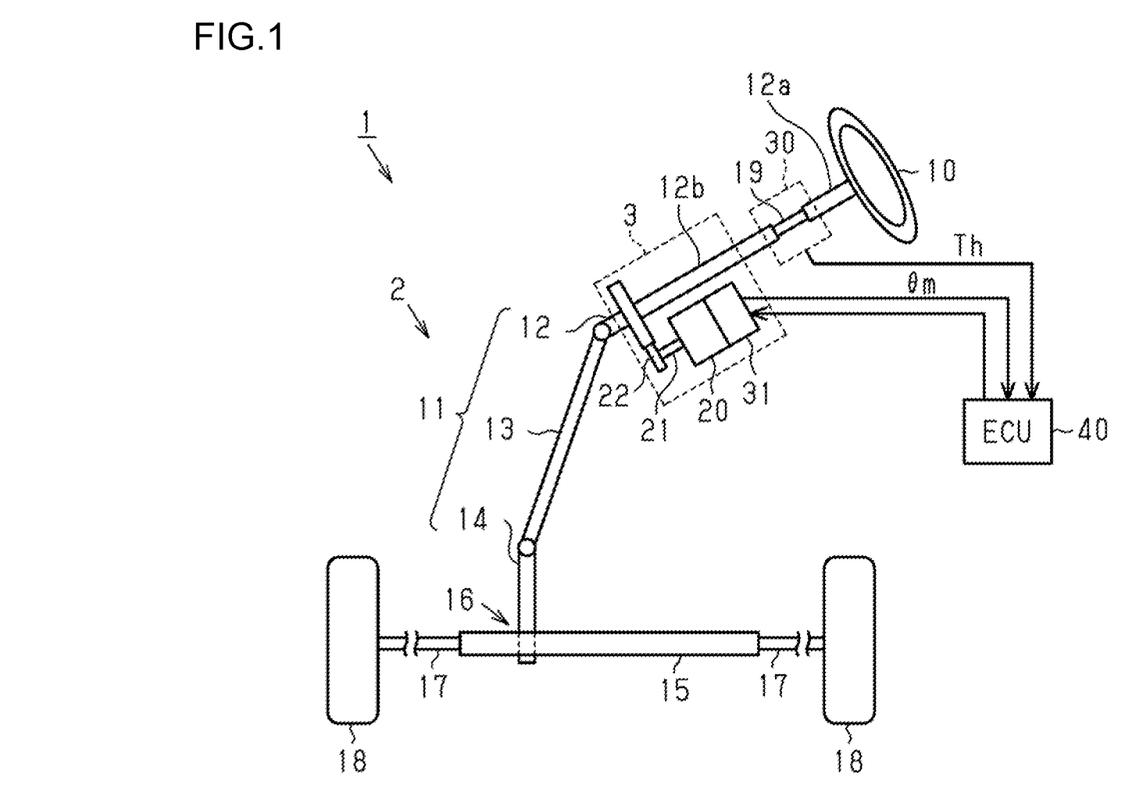
FIG. 1 illustrates a schematic configuration of an electric power steering system according to an embodiment.

An embodiment in which a torque detection device according to the present invention is applied to an electric power steering system (hereinafter referred to as an "EPS") will be described below. As illustrated in FIG. 1, the EPS 1 includes a steering mechanism 2 that steers steered wheels 18 on the basis of an operation of a steering wheel 10 performed by a driver, an assist mechanism 3 that assists the driver in performing a steering operation, and an electronic control unit (ECU) 40 that controls the assist mechanism 3.

The steering mechanism 2 includes the steering wheel 10 and a steering shaft 11 that rotates together with the steering wheel 10. The steering shaft 11 has a column shaft 12 coupled to the steering wheel 10, an intermediate shaft 13 coupled to the lower end portion of the column shaft 12, and a pinion shaft 14 coupled to the lower end portion of the intermediate shaft 13. The lower end portion of the pinion shaft 14 is coupled to a rack shaft 15, which serves as a steered shaft, via a rack-and-pinion mechanism 16. Thus, in the steering mechanism 2, rotational motion of the steering shaft 11 is converted into reciprocal linear motion in the axial direction of the rack shaft 15 (the right-left direction in FIG. 1) via the rack-and-pinion mechanism 16 which is composed of a pinion gear provided at the distal end of the pinion shaft 14 and a rack provided on the rack shaft 15. The reciprocal linear motion is transferred to the right and left steered wheels 18 via tie rods 17 coupled to both ends of the rack shaft 15 to vary the steered angle of the steered wheels 18 to change the advancing direction of the vehicle.

The assist mechanism 3 includes a motor 20 that applies an assist force to the steering shaft 11. A rotary shaft 21 of the motor 20 is coupled to the column shaft 12 via a speed reduction mechanism 22. The speed reduction mechanism 22 reduces the speed of rotation of the motor 20, and transfers a rotational force at the reduced speed to the column shaft 12. That is, a rotational force (motor torque) of the motor 20 is applied to the steering shaft 11 as an assist force to assist the driver in performing a steering operation. Examples of the motor 20 include a three-phase brushless motor that is rotated on the basis of drive electric power with three phases (U-, V-, and W-phases).

The ECU 40 controls the motor 20 on the basis of the results of detection performed by various sensors provided in the vehicle. Examples of the various sensors include a torque sensor 30 that serves as the torque detection device, and a rotational angle sensor 31. The torque sensor 30 is provided to the column shaft 12. The rotational angle sensor 31 is provided to the motor 20. The column shaft 12 is constituted of an input shaft 12a on the steering wheel 10 side and an output shaft 12b on the intermediate shaft 13 side. The input shaft 12a and the output shaft 12b are coupled to each other by a torsion bar 19. The torsion bar 19 is deformed to be warped when an operation of the steering wheel 10 is transferred to the output shaft 12b via the input shaft 12a. The torque sensor 30 detects steering torque Th applied to the steering shaft 11 on the basis of a warp in the torsion bar 19 caused along with a steering operation performed by the driver. The rotational angle sensor 31 detects a rotational angle Om of the rotary shaft 21. The ECU 40 sets a target assist force on the basis of outputs from the sensors, and controls a current supplied to the motor 20 such that the actual assist force becomes the target assist force.

Figure 2:
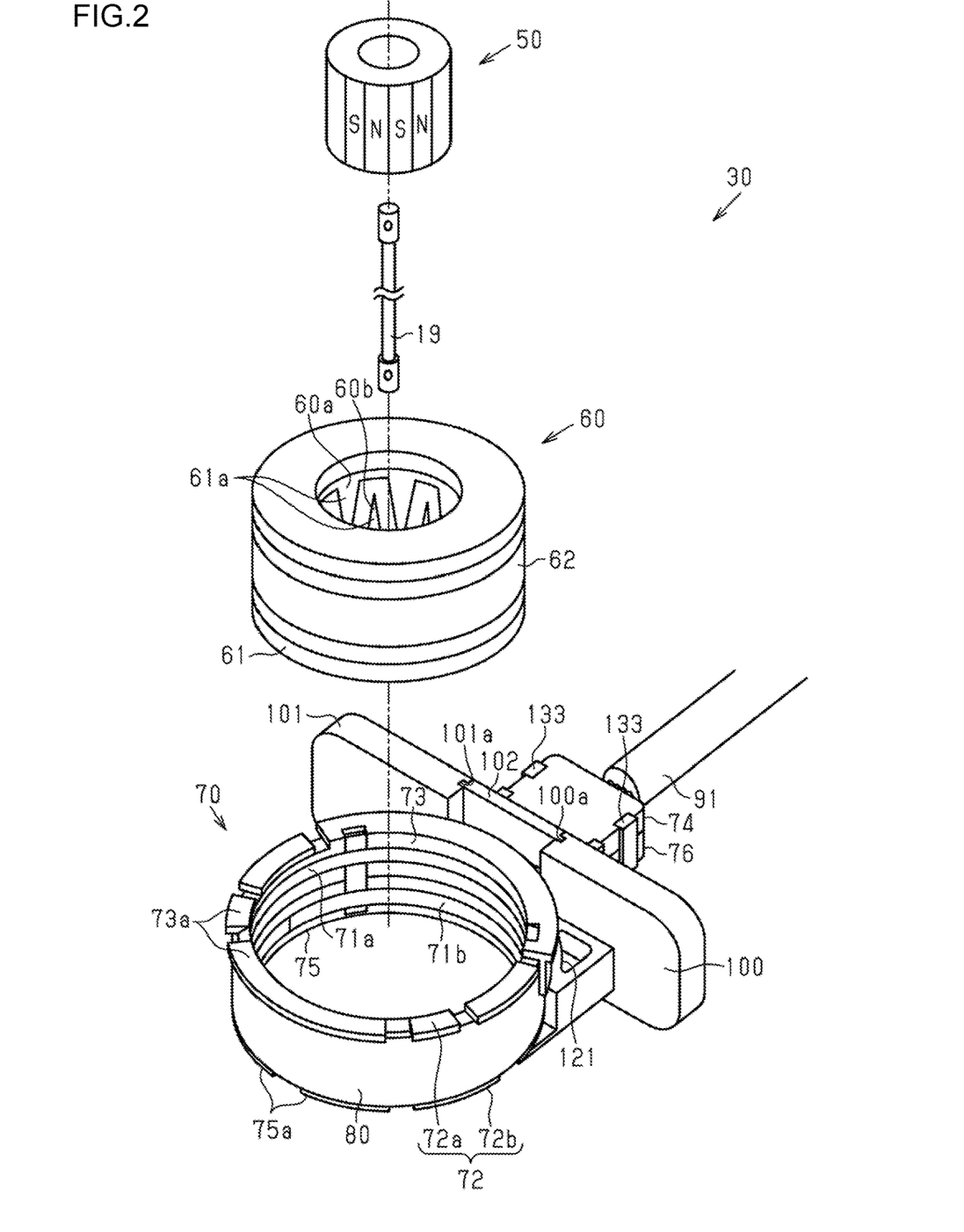
FIG. 2 is an exploded perspective view illustrating the configuration of a torque detection device of the electric power steering system according to the embodiment.

The torque sensor 30 (torque detection device) will be described in detail. As illustrated in FIG. 2, the torque sensor 30 has the torsion bar 19, a permanent magnet 50 coupled to the input shaft 12a, a cylindrical yoke 60 coupled to the output shaft 12b, and a tubular magnetism collection unit 70 disposed so as to cover the periphery of the yoke 60.

The yoke 60 is disposed coaxially with the output shaft 12b. The yoke 60 is provided around the permanent magnet 50 with a certain clearance therefrom. The yoke 60 includes two magnetic yokes 60a and 60b. The magnetic yokes 60a and 60b each include lugs 61a in an isosceles triangle shape provided at equal intervals in the circumferential direction to extend in a direction that is perpendicular to a flat surface of a plate-shaped annular portion 61. The lugs 61a are molded in a synthetic resin body 62 with the respective lugs 61a facing each other in the axial direction as displaced at certain intervals in the circumferential direction. Surfaces of the magnetic yokes 60a and 60b that face the permanent magnet 50 are exposed from the synthetic resin body 62.

In a neutral state in which torque is not applied to the input shaft 12a, the distal ends of the respective lugs 61a of the magnetic yokes 60a and 60b point toward the boundaries between the N poles and the S poles of the permanent magnet 50.

The magnetism collection unit 70 includes: two magnetism collection rings 71a and 71b that guide magnetic flux from the magnetic yokes 60a and 60b, respectively; first and second magnetism collection holders 72a and 72b that hold the magnetism collection rings 71a and 71b, respectively; and a magnetic shield 80 that covers the outer peripheries of the magnetism collection rings 71a and 71b. The first magnetism collection holder 72a and the second magnetism collection holder 72b constitute a magnetism collection holder 72. That is, the magnetism collection holder 72 is constituted by assembling the first magnetism collection holder 72a and the second magnetism collection holder 72b which are adjacent to each other in the axial direction.

Figure 3A:
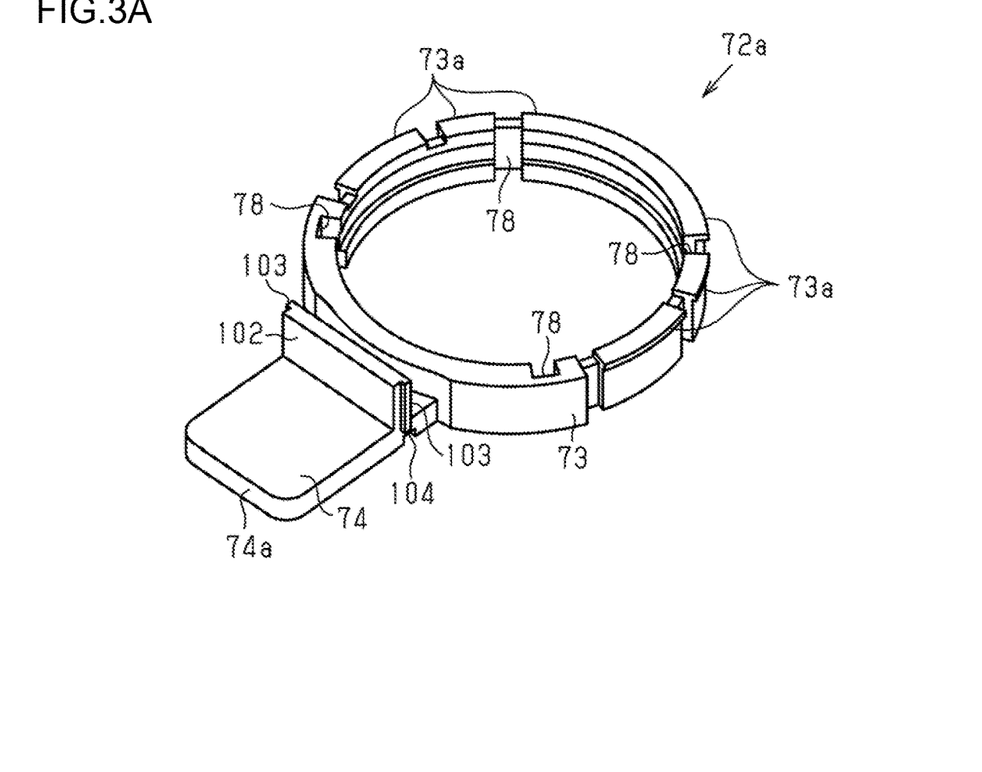
FIG. 3A is an exploded perspective view of a first magnetism collection holder of the torque detection device.

As illustrated in FIG. 3A, the first magnetism collection holder 72a has an annular first ring portion 73 and a rectangular plate-shaped substrate housing portion 74 integrally coupled to the outer peripheral surface of the first ring portion 73 to project radially outward. A plurality of (four) recessed portions 78 are provided in the inner peripheral surface of the first ring portion 73 of the first magnetism collection holder 72a. The first magnetism collection holder 72a is made of a synthetic resin, for example.

As illustrated in FIG. 2, the magnetism collection ring 71a is held on the inner peripheral surface of the first ring portion 73, and the inner peripheral surface of the first ring portion 73 faces the outer peripheral surface of the yoke 60 via a clearance in the radial direction. The magnetic yoke 60a and the magnetism collection ring 71a face each other via a clearance in the radial direction. In addition, the magnetic yoke 60b and the magnetism collection ring 71b face each other via a clearance in the radial direction.

Figure 3B:
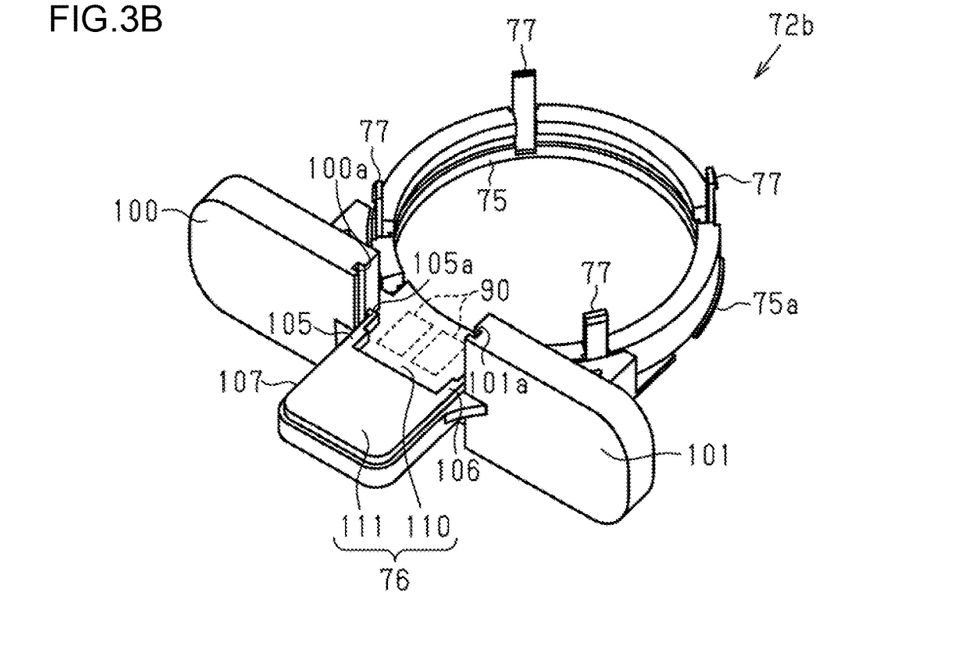
FIG. 3B is an exploded perspective view of a second magnetism collection holder of the torque detection device.

A plurality of flange portions 73a that project radially outward are provided on an end surface of the first ring portion 73 on the opposite side of the second magnetism collection holder 72b. As illustrated in FIG. 3B, the second magnetism collection holder 72b has an annular second ring portion 75 and a rectangular plate-shaped substrate housing portion 76 integrally coupled to the outer peripheral surface of the second ring portion 75 to project radially outward. The second magnetism collection holder 72b is made of a synthetic resin, for example. A substrate provided with Hall ICs 90 is disposed in the substrate housing portion 76. The inside diameter and the outside diameter of the second ring portion 75 are the same as the inside diameter and the outside diameter, respectively, of the first ring portion 73 of the first magnetism collection holder 72a. As illustrated in FIG. 2, the magnetism collection ring 71b is held on the inner peripheral surface of the second ring portion 75. The magnetic yoke 60a and the magnetism collection ring 71b are disposed so as to face each other via a clearance in the radial direction. In addition, the magnetic yoke 60b and the magnetism collection ring 71b are disposed so as to face each other via a clearance in the radial direction.

As illustrated in FIG. 3B, a plurality of (four) engagement protrusions 77 that project toward the first magnetism collection holder 72a are provided on the outer peripheral surface of the second ring portion 75 of the second magnetism collection holder 72b. Engagement lugs provided at the distal ends of the engagement protrusions 77 are inserted into the plurality of recessed portions 78 to be engaged with an end surface of the first ring portion 73 of the first magnetism collection holder 72a in the axial direction. The second magnetism collection holder 72b is disposed coaxially with the first magnetism collection holder 72a with the engagement lugs of the engagement protrusions 77 engaged with the first ring portion 73. In addition, flange portions 75a that project radially outward are provided on the outer peripheral edge portion of an end portion of the second ring portion 75 on the opposite side of the first magnetism collection holder 72a.

The magnetism collection ring 71a and the magnetism collection ring 71b face each other. The Hall ICs 90 which are disposed in the substrate housing portion 76 are covered by the substrate housing portion 74 with the substrate housing portion 74 assembled to the substrate housing portion 76. The Hall ICs 90 are connected to the ECU 40, which is external, via a cord 91 (see FIG. 1).

As illustrated in FIG. 2, the magnetic shield 80 is fitted with the outer peripheral surface of the first ring portion 73 and the outer peripheral surface of the second ring portion 75. A material that can block magnetism such as metal, for example, is adopted as the material of the magnetic shield 80. The magnetic shield 80 is provided as curved in a C-shape in cross section. In addition, the length of the magnetic shield 80 in the axial direction is slightly larger than the total of the respective lengths of the first ring portion 73 and the second ring portion 75 in the axial direction. When the engagement protrusions 77 are engaged with an end portion of the first ring portion 73 in the axial direction, both end portions of the magnetic shield 80 in the axial direction abut against the flange portions 73a of the first ring portion 73 and the flange portions 75a of the second ring portion 75 in the axial direction. The magnetic shield 80 is fixed to the first magnetism collection holder 72a and the second magnetism collection holder 72b.

As illustrated in FIG. 3B, a pair of flanges 100 and 101 are provided on both side surfaces of the substrate housing portion 76 in a direction that is orthogonal to the direction in which the substrate housing portion 76 extends from the second magnetism collection holder 72b. The flanges 100 and 101 have a rectangular parallelepiped shape. The flanges 100 and 101 are provided orthogonally to the substrate housing portion 74. In the stacking direction, the length of the flanges 100 and 101 is set to be larger than the length (thickness) of the substrate housing portion 76. The flanges 100 and 101 project in the stacking direction with respect to a flat plate portion 111 of the substrate housing portion 76. Guide grooves 100a and 101a are provided in end surfaces of the flanges 100 and 101 that face each other. The guide grooves 100a and 101a extend in the stacking direction of the substrate housing portion 74 and the substrate housing portion 76.

As illustrated in FIGS. 2 and 3A, a plate-shaped partition wall 102 that extends along the stacking direction of the substrate housing portion 74 and the substrate housing portion 76 is provided on a surface of the substrate housing portion 74 on the opposite side of the substrate housing portion 76. Flange portions 103 that project laterally are provided on portions of both side surfaces of the partition wall 102 on the first ring portion 73 side. Portions of both side surfaces of the partition wall 102 that are not provided with the flange portions 103 are flush with both side surfaces of the substrate housing portion 74. The flange portions 103 of the partition wall 102 are fitted with the guide grooves 100a and 101a of the flanges 100 and 101. In addition, a recessed portion 104 as a concavo-convex shape notched into a rectangular shape is provided in a surface of the substrate housing portion 74 on the opposite side of the partition wall 102. For example, the recessed portion 104 corresponds to the partition wall 102 in the stacking direction of the substrate housing portion 74 and the substrate housing portion 76. As illustrated in FIG. 3B, a substrate arrangement portion 110, which is a portion of the substrate housing portion 76 in which the Hall ICs 90 are disposed, is formed so as to be lower than the flat plate portion 111, which is the other portion of the substrate housing portion 76.

Figure 4:
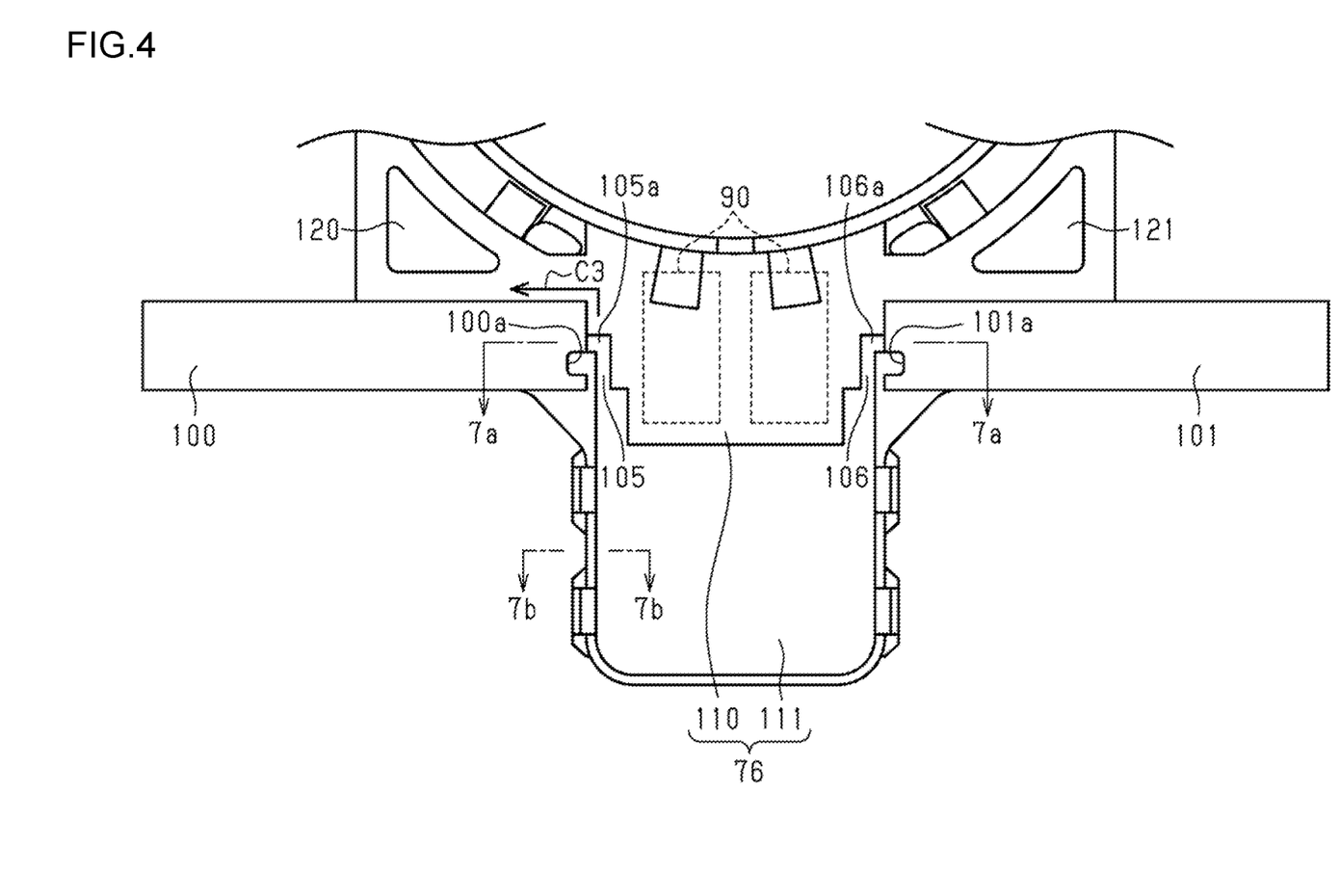
FIG. 4 is a top view of the second magnetism collection holder of the torque detection device.

As illustrated in FIGS. 3B and 4, the substrate arrangement portion 110 is provided with partitioning portions 105 and 106 that extend from the flat plate portion 111 toward the second ring portion 75. An extended portion 105a is provided at the distal end of the partitioning portion 105. The extended portion 105a is positioned in correspondence with a portion of the flange 100 on the second ring portion 75 side with respect to a portion of the flange 100 provided with the guide groove 100a. The extended portion 105a extends toward the second ring portion 75 with respect to a portion of the flange 100 provided with the guide groove 100a in a direction that is orthogonal to the direction in which the partitioning portion 105 extends. The extended portion 105a contacts a portion of the flange 100 on the second ring portion 75 side with respect to a portion of the flange 100 provided with the guide groove 100a. Meanwhile, the partitioning portion 105 does not contact a portion of the flange 100 on the opposite side of the second ring portion 75 with respect to a portion of the flange 100 provided with the guide groove 100a. Similarly to the partitioning portion 105, the partitioning portion 106 is provided with an extended portion 106a at the distal end of the partitioning portion 106. The extended portion 106a is positioned in correspondence with a portion of the flange 101 on the second ring portion 75 side with respect to a portion of the flange 101 provided with the guide groove 101a.

When the substrate housing portion 74 and the substrate housing portion 76 are stacked on each other, the flange portions 103 of the partition wall 102 are fitted with the guide grooves 100a and 101a to guide assembly of the first magnetism collection holder 72a and the second magnetism collection holder 72b. When the substrate housing portion 74 and the substrate housing portion 76 are stacked on each other, in addition, the extended portions 105a and 106a are fitted with the recessed portion 104. The partitioning portions 105 and 106 and the extended portions 105a and 106a of are concavo-convex shapes of the substrate housing portions 74 and 76.

A stepped portion 107 is provided at the peripheral edge portion of the flat plate portion 111. The stepped portion 107 is provided at a lower position than the flat plate portion 111. When the substrate housing portion 74 and the substrate housing portion 76 are stacked on each other, the stepped portion 107 is fitted with a peripheral wall portion 74a provided at the peripheral edge portion of the substrate housing portion 74. That is, the upper surface of the substrate housing portion 76 is covered by the substrate housing portion 74 with the peripheral wall portion 74a disposed along the stepped portion 107.

As illustrated in FIG. 4, the second magnetism collection holder 72b is provided with triangular reservoir portions 120 and 121 between the second ring portion 75 and the flanges 100 and 101, respectively.

Figure 5:
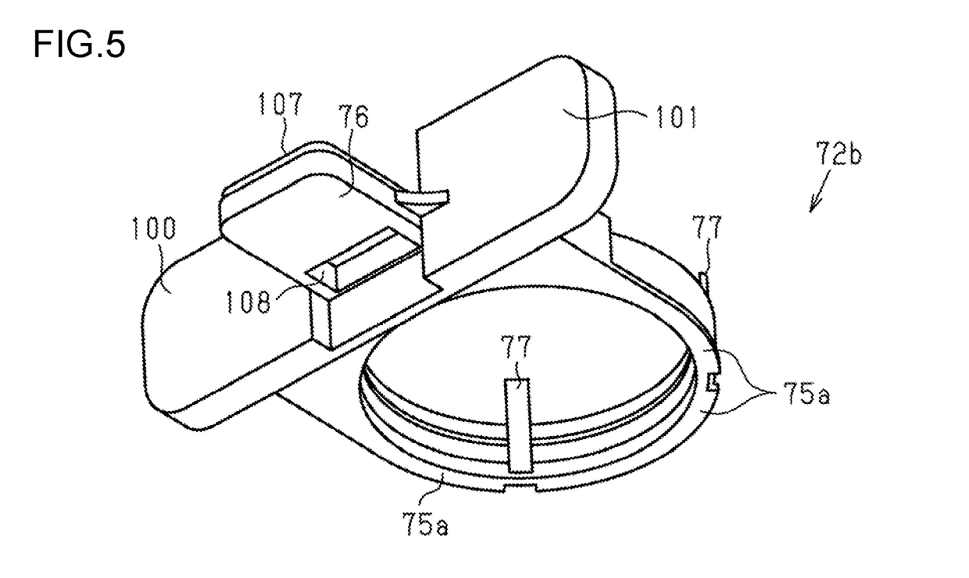
FIG. 5 is a bottom view of the second magnetism collection holder of the torque detection device.

As illustrated in FIG. 5, a hollow fitting portion 108 is provided in the bottom surface of the substrate housing portion 76 on the opposite side of the substrate housing portion 74. The fitting portion 108 is provided to facilitate the work of fixing the Hall ICs 90 when attaching the Hall ICs 90 etc.

Figure 6:
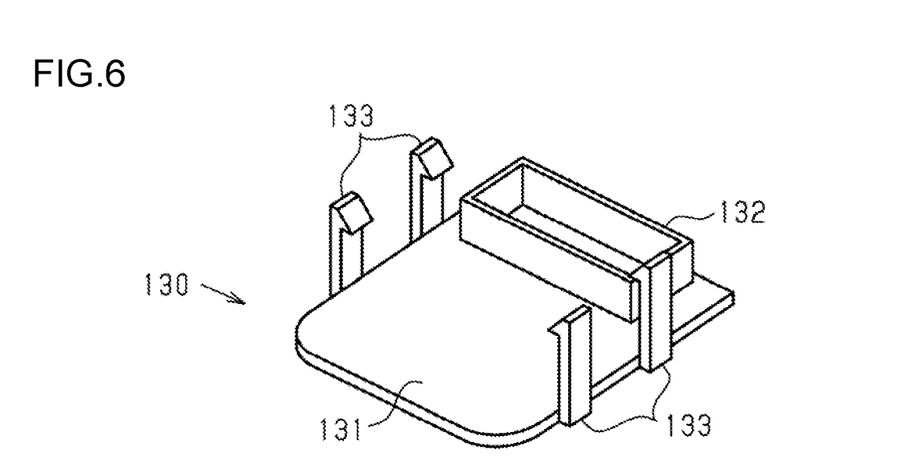
FIG. 6 is a perspective view of a lid portion attached to the bottom surface of the second magnetism collection holder of the torque detection device.

As illustrated in FIGS. 5 and 6, a lid portion 130 with a bottom surface in a flat plate shape is attached to the bottom surface of the substrate housing portion 76. The lid portion 130 has a bottom wall portion 131. The contour shape of the bottom wall portion 131 corresponds to the bottom surface shape of the substrate housing portion 76. A reservoir portion 132 in a rectangular parallelepiped shape is provided on a surface of the bottom wall portion 131 of the lid portion 130 that faces the fitting portion 108. The reservoir portion 132 is provided so as to project from the bottom wall portion 131, and the center portion of the reservoir portion 132 is recessed toward the bottom wall portion 131. In addition, the lid portion 130 is provided with four engagement protrusions 133. The first magnetism collection holder 72a and the second magnetism collection holder 72b are held by the bottom wall portion 131 and the engagement protrusions 133 (lug portions at the distal ends) of the lid portion 130 (see FIG. 2) with the first magnetism collection holder 72a (substrate housing portion 74) and the second magnetism collection holder 72b (substrate housing portion 76) stacked on each other. Consequently, the first magnetism collection holder 72a and the second magnetism collection holder 72b are assembled to each other.

The function and the effect of the embodiment will be described. Foreign matter such as water that has intruded into the EPS 1 may adhere to the outer surface of the torque sensor 30. If water intrudes into the first magnetism collection holder 72a and the second magnetism collection holder 72b of the torque sensor 30 to contact the Hall ICs 90, an abnormality may be caused in the Hall ICs 90.

Figure 7A:
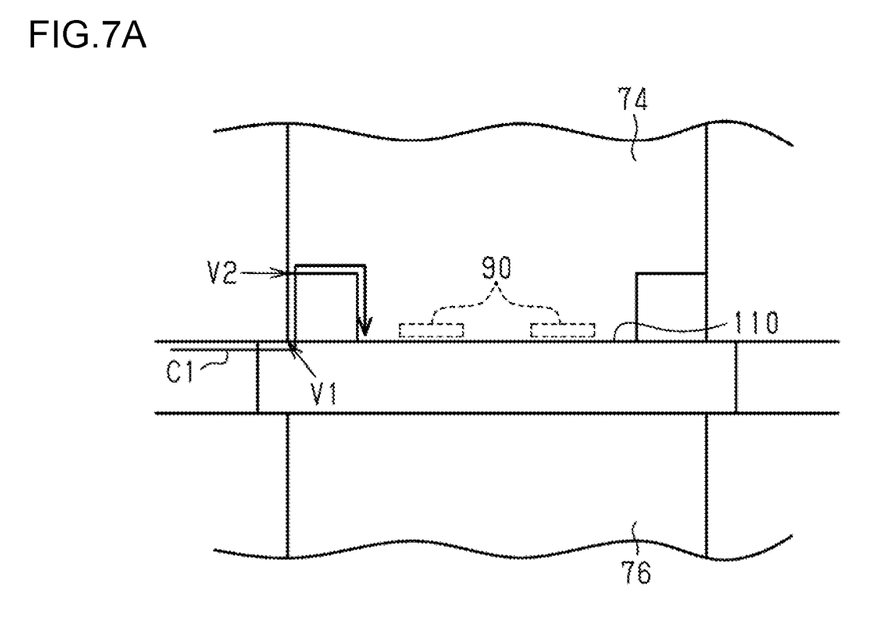
FIG. 7A is a schematic sectional view taken along the line 7a-7a in FIG. 4, illustrating a path for intrusion of water into the torque detection device.
Figure 7B:
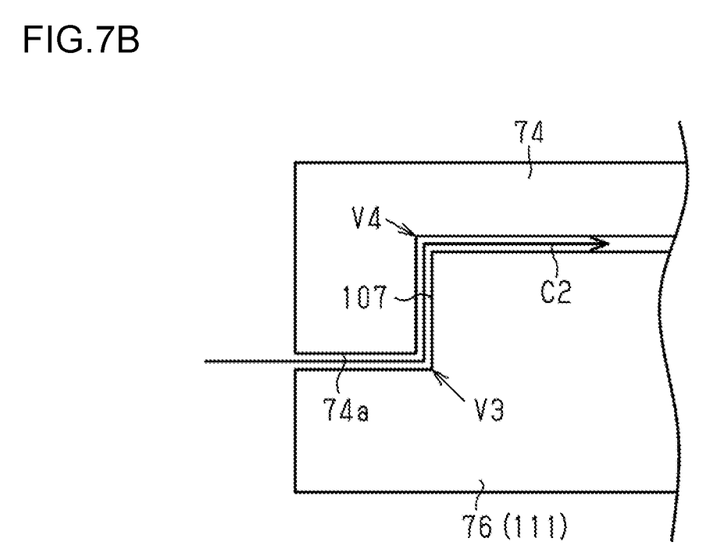
FIG. 7B is a schematic sectional view taken along the line 7b-7b in FIG. 4, illustrating a path for intrusion of water into the torque detection device.

In order for water to make its way to the Hall ICs 90, it is necessary for the water to intrude along surfaces on which the substrate housing portion 74 and the substrate housing portion 76 are stacked on each other along a path indicated by the arrow C1 of FIG. 7A and a path indicated by the arrow C2 of FIG. 7B.

Specifically, as illustrated in FIGS. 7A and 4, water that intrudes along the path indicated by the arrow C1 intrudes into a gap between the peripheral wall portion 74a of the substrate housing portion 74 and the stepped portion 107 of the substrate housing portion 76 from the outside of the substrate housing portion 74 and the substrate housing portion 76. Then, the water that has intruded makes its way to the vicinity of the partitioning portions 105 and 106 and the extended portions 105a and 106a. The partitioning portions 105 and 106 and the extended portions 105a and 106a are provided at a higher position than the substrate arrangement portion 110 (in a projecting manner). Therefore, it is necessary for the water that has intruded to climb over the partitioning portions 105 and 106 and the extended portions 105a and 106a in order to make its way to the Hall ICs 90. In this event, it is necessary for the water that has intruded from the outside to intrude via corner portions V1 and V2, which accordingly makes it difficult for such water to intrude into the magnetism collection holder 72. The corner portions V1 and V2 form a cranked path. The corner portions V1 and V2 form a type of a labyrinth structure.

Meanwhile, as illustrated in FIG. 7B, water that intrudes along the path indicated by the arrow C2 intrudes into a gap between the peripheral wall portion 74a of the substrate housing portion 74 and the stepped portion 107 of the substrate housing portion 76 from the outside of the substrate housing portion 74 and the substrate housing portion 76. Then, the water would intrude into a gap between the flat plate portion 111 and the bottom surface of the substrate housing portion 74 (a surface on the substrate housing portion 76 side) via two corner portions V3 and V4 formed between the peripheral wall portion 74a of the substrate housing portion 74 and the stepped portion 107 of the substrate housing portion 76 to make its way to the Hall ICs 90 in the substrate arrangement portion 110. However, it is necessary for water that has intruded from the outside to intrude via the two corner portions V3 and V4 which are formed between the peripheral wall portion 74a of the substrate housing portion 74 and the stepped portion 107 of the substrate housing portion 76, which accordingly makes it difficult for such water to intrude into the magnetism collection holder 72. Intrusion of water into the magnetism collection holder 72 is suppressed also by the fact that the path for intrusion to the substrate arrangement portion 110 from the outside of the substrate housing portion 74 and the substrate housing portion 76 is elongated by providing the corner portions V3 and V4. The corner portions V3 and V4 form a type of a labyrinth structure.

Even if water would intrude through a gap between the guide grooves 100a and 101a, which are provided in the flanges 100 and 101, and the partition wall 102, it is necessary for the water to climb over the two corner portions V3 and V4 which are provided between the guide grooves 100a and 101a, which are provided in the flanges 100 and 101, and the partition wall 102. Therefore, it is difficult for such water to intrude into the magnetism collection holder 72.

The fitting portion 108 is filled with the reservoir portion 132 by attaching the lid portion 130 to the bottom surface of the substrate housing portion 76. Thus, intrusion of water from the fitting portion 108 is suppressed. This is because, in the case where water makes its way to the Hall ICs 90 through a gap between the substrate housing portion 76 and the lid portion 130, the corner portions which are formed between the substrate housing portion 76 and the reservoir portion 132 of the lid portion 130 makes it necessary for the water which has intruded to progress against the direction of the gravitational force. When the torque sensor 30 is mounted on the EPS 1, the substrate housing portion 76 is positioned on the lower side of the substrate housing portion 74 in the direction of the gravitational force. The water that has intruded can be stored in the reservoir portion 132 by providing the lid portion 130 with the reservoir portion 132. Therefore, it is possible to suppress such water reaching the Hall ICs 90.

The concavo-convex shape which is formed by the flange portion 103 and the guide grooves 100a and 101a suppresses intrusion of water through a path between the partition wall 102 and the flanges 100 and 101.

Water that has intruded into the magnetism collection holder 72 is stored in the reservoir portions 120 and 121 which are provided in the second magnetism collection holder 72b. Consequently, it is possible to suppress water reaching the Hall ICs 90. For example, if water does not make its way to the Hall ICs 90 but moves to the reservoir portion 120 as indicated by the arrow C3 (see FIG. 4) even in the case where water has intruded into the substrate arrangement portion 110, the recess of the reservoir portion 120 suppresses water making its way to the Hall ICs 90 thereafter.

The embodiment may be modified as follows. The following other embodiments may be combined with each other as long as the embodiments do not technically contradict with each other. In the embodiment, the Hall ICs 90 are adopted as elements that detect torque. However, the embodiment is not limited thereto. For example, ICs that include elements that detect magnetism such as magnetoresistance effect elements and magnetoimpedance elements may be adopted as elements that detect torque.

In the embodiment, the two corner portions V3 and V4 which are formed between the peripheral wall portion 74a of the substrate housing portion 74 and the stepped portion 107 of the substrate housing portion 76 suppress intrusion of water into the magnetism collection holder 72. However, the embodiment is not limited thereto. Three or more corner portions V3 and V4 may be provided.

In the embodiment, the two corner portions V1 and V2 which are formed by the partitioning portions 105 and 106 and the extended portions 105a and 106a suppress intrusion of water into the magnetism collection holder 72. However, the embodiment is not limited thereto. Three or more corner portions V1 and V2 may be provided.

In the description, intrusion of water into the magnetism collection holder 72 is suppressed. However, the embodiment is not limited thereto. Intrusion of foreign matter such as dust is also suppressed. In the embodiment, the corner portions V1 and V2 and the corner portions V3 and V4 are provided. However, only the corner portions V1 and V2 or the corner portions V3 and V4 may be provided.

In the embodiment, the substrate housing portion 76 of the second magnetism collection holder 72b is provided with the fitting portion 108. However, the substrate housing portion 76 may not be provided with the fitting portion 108. That is, the bottom surface of the substrate housing portion 76 on the opposite side of the substrate housing portion 74 may be filled in advance. In this case, the lid portion 130 may not be provided.

The torque sensor 30 may be applied not only to the EPS 1 which assists linear motion of the rack shaft 15, which is caused in conjunction with a steering operation, utilizing the rotational force of the motor 20, but also to a steer-by-wire (SBW) system. In addition, the torque sensor 30 may be implemented not only as a torque sensor 30 for a front-wheel steering system, but also as a torque sensor 30 for a rear-wheel steering system or a four-wheel steering (4WS) system.

What is claimed is:

1. A torque detection device comprising:
a permanent magnet;
a magnetic yoke which is disposed in a magnetic field formed by the permanent magnet and a position of which relative to the permanent magnet is variable;
a tubular magnetism collection unit that has a tubular magnetism collection holder and a magnetism collection ring, the magnetism collection holder being formed so as to surround the magnetic yoke and composed of a first magnetism collection holder and a second magnetism collection holder, which are adjacent to each other in an axial direction, assembled to each other, and the magnetism collection ring being attached to an inner peripheral surface of the magnetism collection holder to collect magnetic flux of the magnetic yoke; and
a sensor that detects magnetic flux generated in a magnetic circuit formed by the permanent magnet, the magnetic yoke, and the magnetism collection ring, wherein:
the first magnetism collection holder and the second magnetism collection holder have respective substrate housing portions that project in a radial direction to house the sensor; and
a concavo-convex shape on a side of the substrate housing portion of the first magnetism collection holder and a concavo-convex shape on a side of the substrate housing portion of the second magnetism collection holder are formed on respective mating surfaces of the substrate housing portion of the first magnetism collection holder and the substrate housing portion of the second magnetism collection holder to be fitted with each other, wherein:
a pair of flanges are provided on both side surfaces of the substrate housing portion of the second magnetism collection holder;
the pair of flanges face each other;
a partition wall to be attached between the pair of flanges is provided on a surface of the substrate housing portion of the first magnetism collection holder on an opposite side of the second magnetism collection holder;
a portion of the substrate housing portion of the second magnetism collection holder on the opposite side of the magnetism collection ring from a portion in which the sensor is disposed is provided with a partitioning portion that projects in a mating direction of the mating surfaces with respect to a portion of the substrate housing portion of the second magnetism collection holder in which the sensor is disposed, the partitioning portion serving as a part of the concavo-convex shape of the second magnetism collection holder;
the substrate housing portion of the first magnetism collection holder is provided with a recessed portion corresponding to the partitioning portion and serving as a part of the concavo-convex shape of the first magnetism collection holder; and
the recessed portion is fitted with the partitioning portion with the partition wall attached between the pair of flanges.

2. The torque detection device according to claim 1, wherein
the concavo-convex shape of the substrate housing portion of the first magnetism collection holder and the concavo-convex shape of the substrate housing portion of the second magnetism collection holder are provided with a plurality of steps.

3. The torque detection device according to claim 1, wherein
the concavo-convex shapes have a portion that extends along a mating direction of the first magnetism collection holder and the second magnetism collection holder.

4. The torque detection device according to claim 1, wherein:
a peripheral edge portion of the substrate housing portion of the second magnetism collection holder is provided with a stepped portion that serves as a part of the concavo-convex shape of the second magnetism collection holder; and
a peripheral edge portion of the substrate housing portion of the first magnetism collection holder is provided with a peripheral wall portion that serves as a part of the concavo-convex shape of the first magnetism collection holder to be fitted with the stepped portion.

5. A torque detection device comprising:

a permanent magnet;

a magnetic yoke which is disposed in a magnetic field formed by the permanent magnet and a position of which relative to the permanent magnet is variable;

a tubular magnetism collection unit that has a tubular magnetism collection holder and a magnetism collection ring, the magnetism collection holder being formed so as to surround the magnetic yoke and composed of a first magnetism collection holder and a second magnetism collection holder, which are adjacent to each other in an axial direction, assembled to each other, and the magnetism collection ring being attached to an inner peripheral surface of the magnetism collection holder to collect magnetic flux of the magnetic yoke; and a sensor that detects magnetic flux generated in a magnetic circuit formed by the permanent magnet, the magnetic yoke, and the magnetism collection ring, wherein:

the first magnetism collection holder and the second magnetism collection holder have respective substrate housing portions that project in a radial direction to house the sensor; and a concavo-convex shape on a side of the substrate housing portion of the first magnetism collection holder and a concavo-convex shape on a side of the substrate housing portion of the second magnetism collection holder are formed on respective mating surfaces of the substrate housing portion of the first magnetism collection holder and the substrate housing portion of the second magnetism collection holder to be fitted with each other, wherein:

a hollow fitting portion is provided in an end surface of the second magnetism collection holder on the opposite side of the first magnetism collection holder; and a lid portion is attached to the second magnetism collection holder with the fitting portion fitted with a reservoir portion that projects toward the fitting portion along the mating direction of the mating surfaces, one surface of the reservoir portion being opened.

6. The torque detection device according to claim 5, wherein the concavo-convex shape of the substrate housing portion of the first magnetism collection holder and the concavo-convex shape of the substrate housing portion of the second magnetism collection holder are provided with a plurality of steps.

7. The torque detection device according to claim 5, wherein the concavo-convex shapes have a portion that extends along a mating direction of the first magnetism collection holder and the second magnetism collection holder.

8. The torque detection device according to claim 5, wherein:

a peripheral edge portion of the substrate housing portion of the second magnetism collection holder is provided with a stepped portion that serves as a part of the concavo-convex shape of the second magnetism collection holder; and a peripheral edge portion of the substrate housing portion of the first magnetism collection holder is provided with a peripheral wall portion that serves as a part of the concavo-convex shape of the first magnetism collection holder to be fitted with the stepped portion.

9. An electric power steering system comprising:

the torque detection device according to claim 1.

10. An electric power steering system comprising:

the torque detection device according to claim 5.

* * * * *